United States Patent
Sun et al.

(10) Patent No.: US 9,843,939 B2
(45) Date of Patent: Dec. 12, 2017

(54) MEASUREMENT OF A FIRST RAT BASED ON METRICS OF A SECOND RAT

(71) Applicant: Apple Inc., Cupertino, CA (US)

(72) Inventors: Xiantao Sun, Sunnyvale, CA (US); Yu-Lin Wang, Fremont, CA (US); Zhu Ji, San Jose, CA (US); Johnson O Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 14/279,412

(22) Filed: May 16, 2014

(65) Prior Publication Data

US 2015/0334584 A1 Nov. 19, 2015

(51) Int. Cl.
*H04W 24/00* (2009.01)
*H04W 24/02* (2009.01)

(52) U.S. Cl.
CPC .................. *H04W 24/02* (2013.01)

(58) Field of Classification Search
CPC ..................................................... H04W 24/10
USPC ....................................................... 455/67.11
See application file for complete search history.

(56) References Cited

U.S. PATENT DOCUMENTS

| | | | |
|---|---|---|---|
| 8,107,950 B2 | 1/2012 | Amirijoo et al. | |
| 8,417,244 B2 | 4/2013 | Alonso-Rubio et al. | |
| 2008/0014957 A1* | 1/2008 | Ore | H04W 36/0088 455/452.1 |
| 2008/0102835 A1* | 5/2008 | Zhao | H04W 36/32 455/436 |
| 2008/0176565 A1 | 7/2008 | Eerolainen et al. | |
| 2009/0268690 A1* | 10/2009 | Sebire | H04W 48/10 370/332 |
| 2010/0208707 A1* | 8/2010 | Hamabe | H04W 24/10 370/332 |
| 2012/0088499 A1* | 4/2012 | Chin | H04W 24/10 455/426.1 |
| 2012/0220302 A1* | 8/2012 | Ebara | H04W 64/006 455/437 |
| 2012/0315905 A1* | 12/2012 | Zhu | H04W 36/36 455/436 |
| 2013/0235849 A1 | 9/2013 | Ekici et al. | |
| 2014/0003259 A1 | 1/2014 | Chin et al. | |
| 2014/0112155 A1* | 4/2014 | Lindoff | H04W 24/08 370/242 |
| 2014/0307623 A1* | 10/2014 | Gheorghiu | H04W 76/026 370/328 |
| 2014/0335872 A1* | 11/2014 | Yamada | H04W 24/04 455/450 |
| 2015/0024757 A1* | 1/2015 | Bulakci | H04W 36/0016 455/437 |

(Continued)

*Primary Examiner* — Wen Huang
(74) *Attorney, Agent, or Firm* — Meyertons Hood Kivlin Kowert & Goetzel, P.C.; Jeffrey C. Hood; Joel L. Stevens

(57) ABSTRACT

Performing measurement of a first RAT while connected to a second RAT. The UE may initially communicate with a base station of the second RAT. While maintaining a connection to the base station of the first RAT, the UE may perform base station measurement of the first RAT (e.g., using a single radio of the UE). However, the measurement of the first RAT may be influenced by various factors, such as signal quality metrics of the second RAT. For example, if signal quality metrics are high for the second RAT, measurement of the first RAT may not be desirable, e.g., for battery life reasons.

20 Claims, 8 Drawing Sheets

(56) References Cited

U.S. PATENT DOCUMENTS

2015/0065144 A1* 3/2015 Shen .................... H04W 24/02
455/438
2015/0341829 A1* 11/2015 Futaki .................. H04W 36/28
370/331

* cited by examiner

MEASUREMENT OF A FIRST RAT BASED ON METRICS OF A SECOND RAT

FIELD OF THE INVENTION

The present application relates to wireless devices, and more particularly to a system and method for performing measurement of a first RAT based on metrics of a second RAT.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

SUMMARY OF THE INVENTION

Embodiments described herein relate to a User Equipment (UE) device and associated method for operating the UE device. The UE device may have one or more radios for performing cellular communication or may include only a single radio for performing cellular communication, as desired. The UE may be in an area that may have a first radio access technology (RAT) and a second RAT. The first RAT may be a second generation RAT, such as global system for mobile communications (GSM). The second RAT may be a third generation RAT, such as time division synchronous code division multiple access (TD-SCDMA or "TDS" for short).

The UE may initially communicate with a base station of the second RAT. While maintaining a connection to the base station of the first RAT, the UE may perform base station measurement of the first RAT (e.g., using a single radio of the UE). However, the measurement of the first RAT may be influenced by various factors, such as signal quality metrics of the second RAT. For example, if signal quality metrics are high for the second RAT, measurement of the first RAT may not be desirable, e.g., for battery life reasons.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
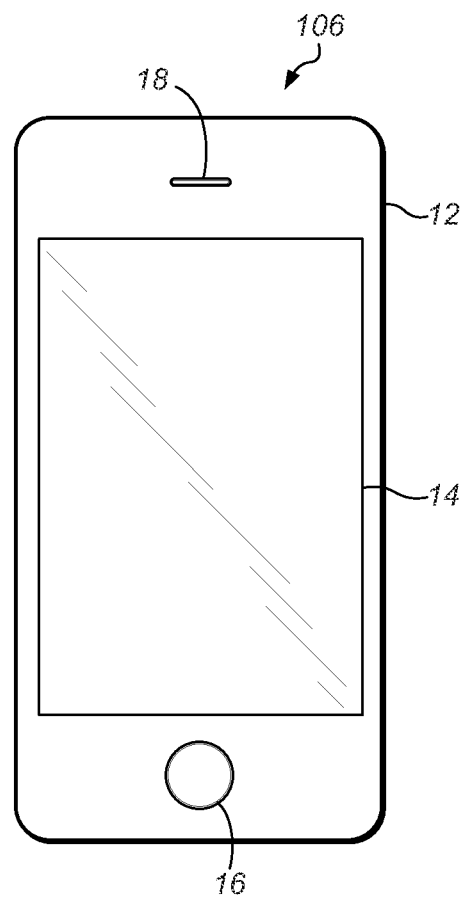
FIG. 1 illustrates an example user equipment (UE) according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
TDS: Time Division Synchronous Code Division Multiple Access
LTE: Long Term Evolution
RAT: Radio Access Technology
TX: Transmit
RX: Receive

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1xRTT or other CDMA radio access technologies), Time Division Synchronous Code Division Multiple Access (TD-SCDMA or TDS), Long Term Evolution (LTE), Advanced LTE, and/or other RATs. For example, the UE 106 may support at three RATs, such as GSM, TDS, and LTE. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiments, the UE 106 comprises two or more radios, i.e., two or more TX/RX chains (two or more TX chains and two or more RX chains).

In the embodiment described herein, the UE 106 comprises two antennas which may be used to communicate using two or more RATs. For example, the UE 106 may have a pair of cellular telephone antennas coupled to a single radio or shared radio. The antennas may be coupled to the shared radio (shared wireless communication circuitry)

using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as GSM and TDS and/or LTE. In the primary embodiment described herein the UE 106 comprises one transmitter chain and two receiver chains (PRX and DRX), wherein the transmitter chain and the two receiver chains (acting as a pair) time multiplex between two (or more) RATs, such as GSM and TDS, and possibly LTE.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support GSM and TDS radio access technologies.

Figure 2:
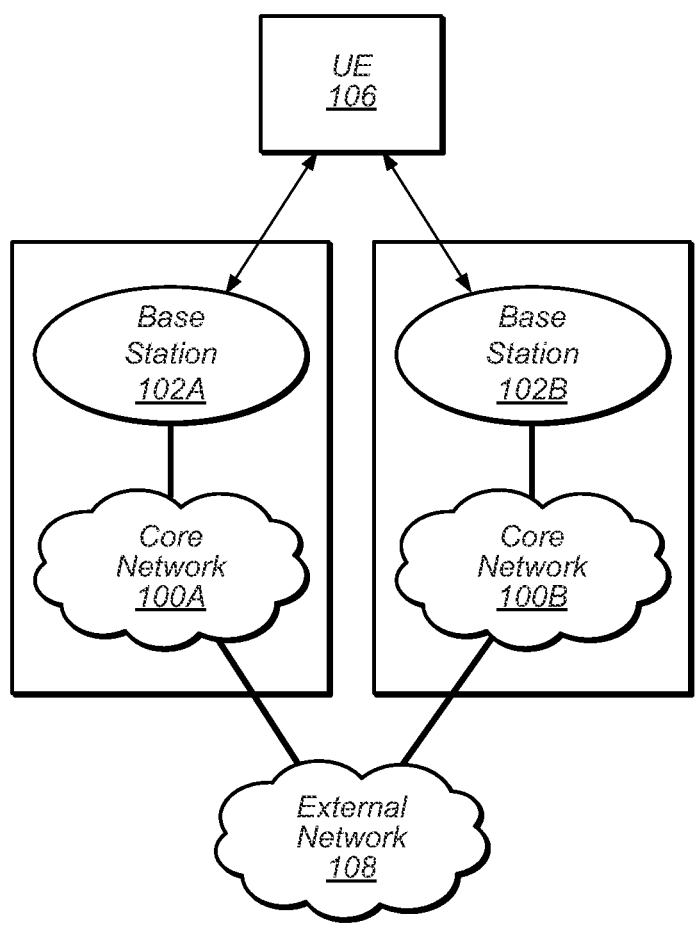
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., GSM) while base station 102B and core network 100B may operate according to a second (e.g., different) RAT (e.g., TDS, or other RATs). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., GSM and TDS, LTE and TDS, LTE and GSM and TDS, and/or any other combination of RATs) might be coupled to a network or service provider that also supports the different cellular communication technologies.

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
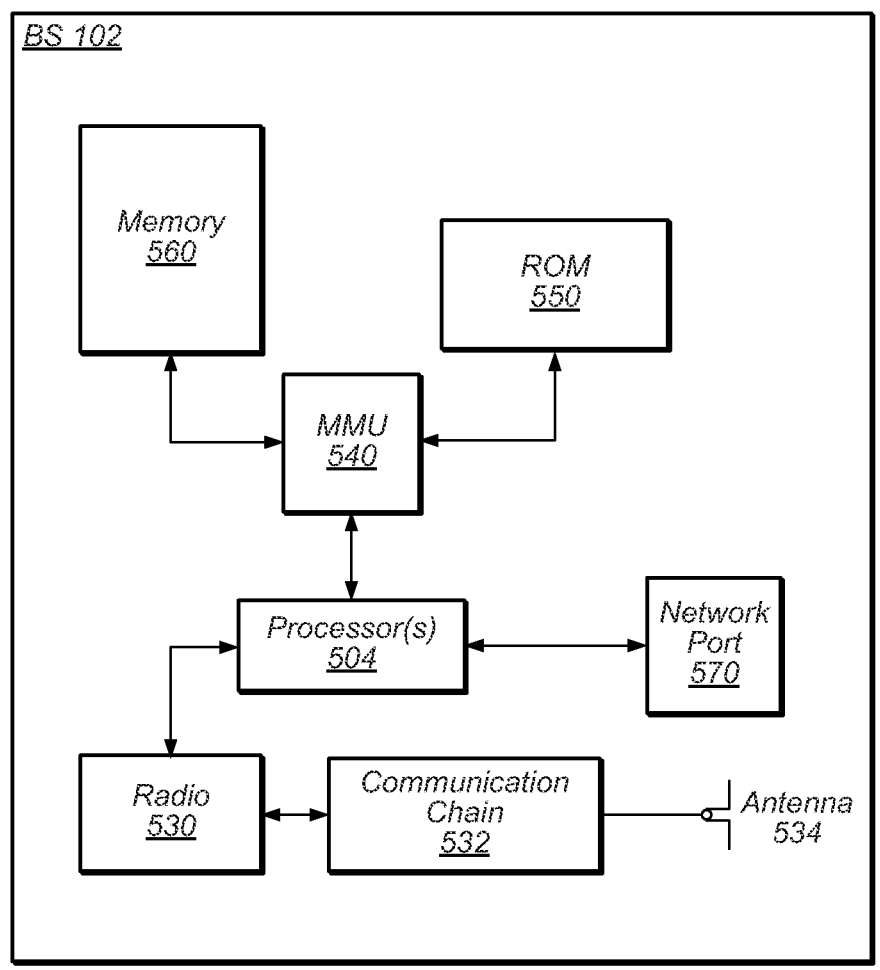
FIG. 3 is an example block diagram of a base station, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, TDS, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
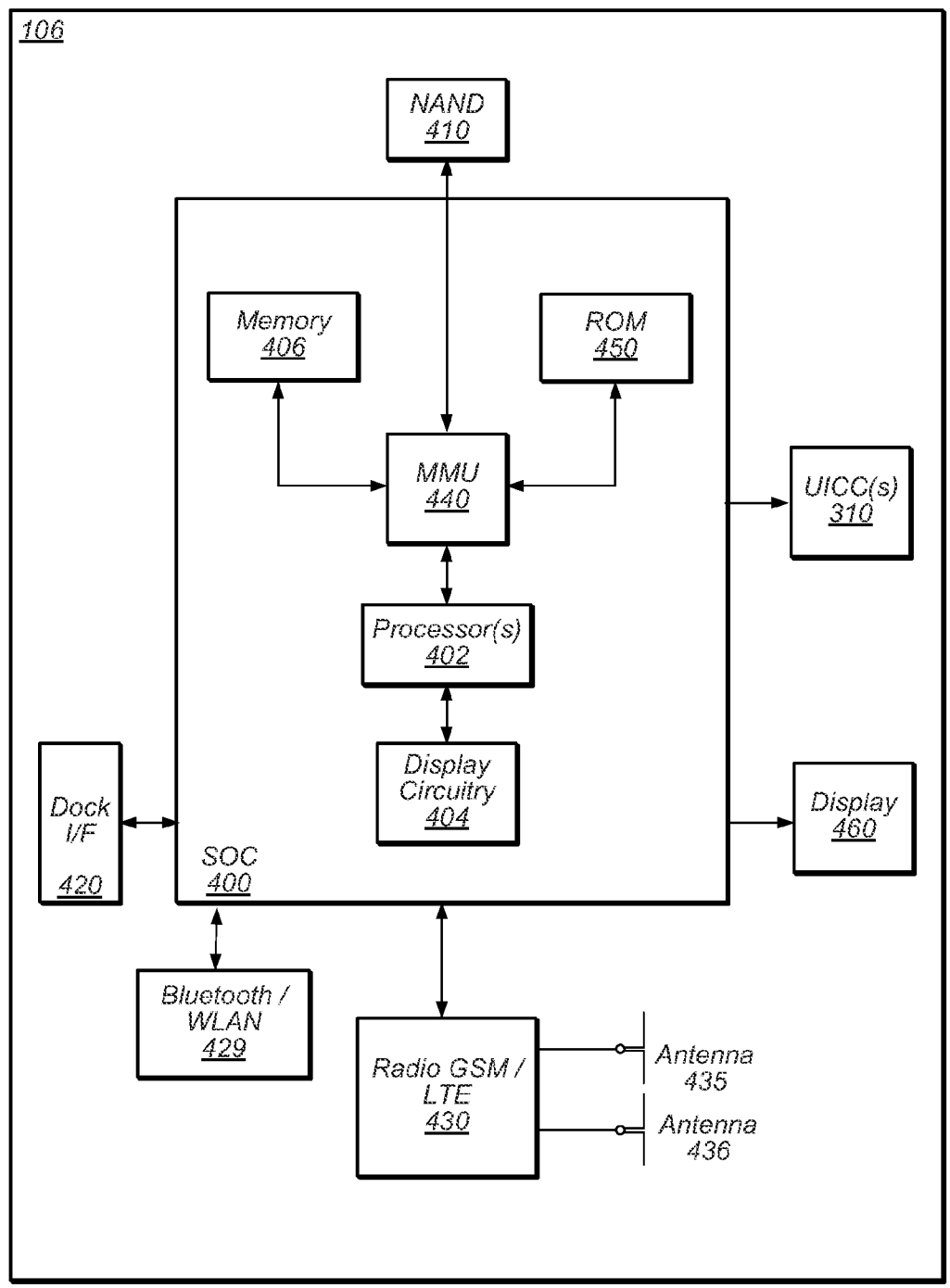
FIG. 4 is an example block diagram of a UE, according to one embodiment.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, TDS, etc., and short range wireless communication circuitry 429 (e.g., Buletooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as GSM, and a second smart card 310 may comprise SIM functionality to support a second RAT such as TDS. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (e.g., and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
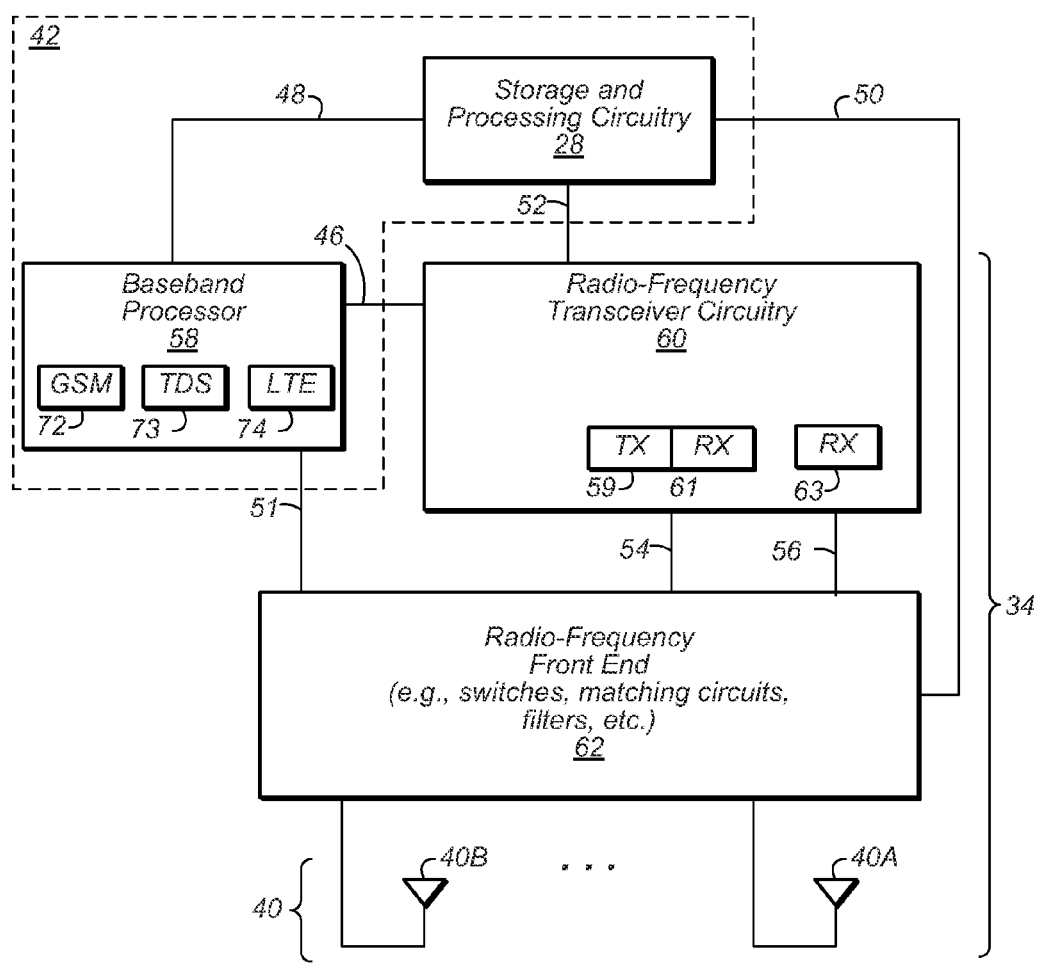
FIGS. 5A and 5B are example block diagrams of wireless communication circuitry in the UE, according to one embodiment.
Figure 5B:
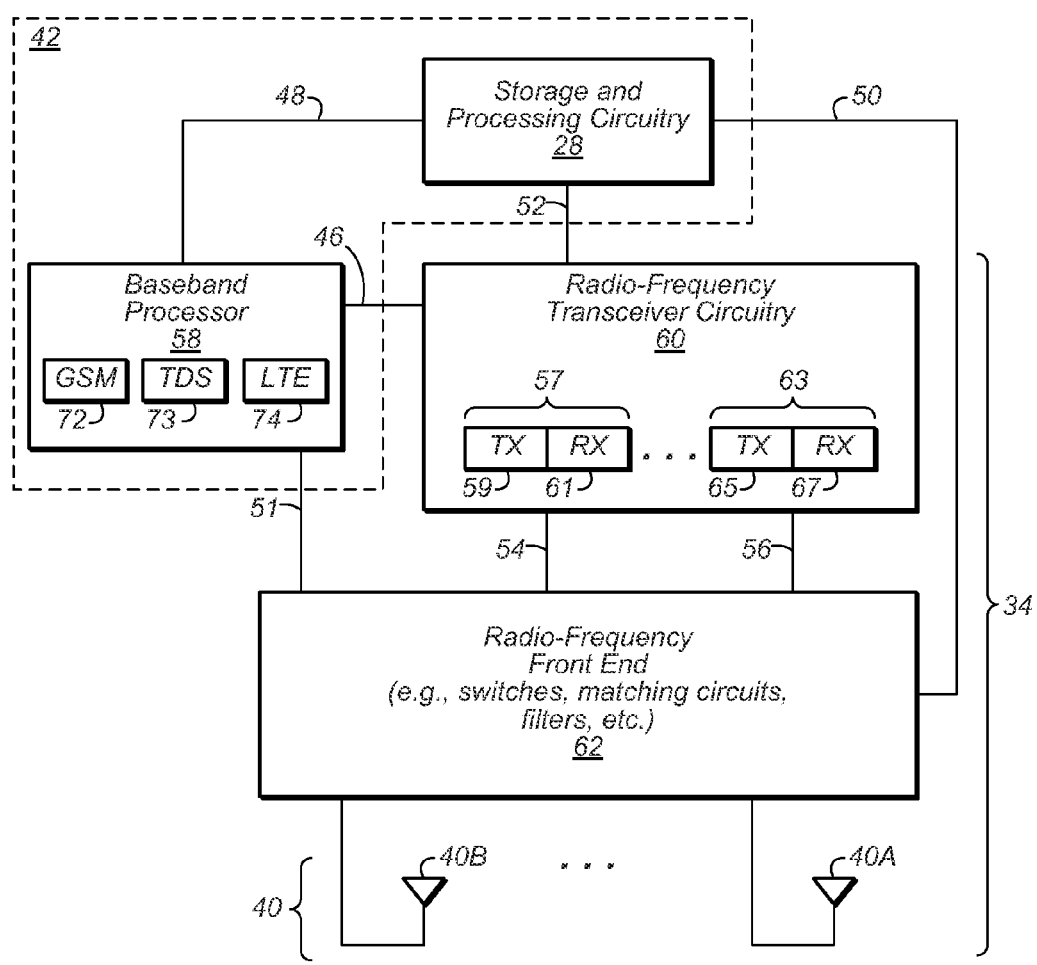

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72, TDS logic 73, LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72, a TDS protocol stack 73, and an LTE protocol stack 74. Thus, protocol stack 72 may be associated with a first RAT such as GSM (as an example), protocol stack 73 may be associated with a second RAT such as TDS, and protocol stack 74 may be associated with a third RAT such as LTE (as an example). During operation, UE 106 may use GSM protocol stack 72 to handle GSM functions, TDS protocol stack 73 to handle TDS functions, and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

In one embodiment of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support GSM, TDS, and LTE traffic, although other embodiments are envisioned which use more than one radio and/or further radio frequency circuitry.

The GSM radio access technology may generally be used to carry voice traffic, whereas the LTE radio access technology may generally be used to carry data traffic. To ensure that GSM voice calls are not interrupted due to LTE data traffic, GSM operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE and GSM functions. Similar remarks apply to combinations of TDS and LTE and GSM and TDS.

When a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session. Embodiments of the invention may comprise improved methods for handling tune-away operations, as described below.

In some embodiments, in order for the UE 106 to conserve power, the GSM, TDS, and LTE protocol stacks 72, 73, and 74 may support idle mode operations. Also, one or multiple of the protocol stacks 72-74 may support a discontinuous reception (DRX) mode and/or a connected discontinuous reception (CDRX) mode. DRX mode refers to a mode which powers down at least a portion of UE circuitry when there is no data (or voice) to be received. In DRX and CRDX modes, the UE 106 synchronizes with the base station 102 and wakes up at specified times or intervals to listen to the network. DRX is present in several wireless standards such as UMTS, LTE (Long-term evolution), WiMAX, etc. The terms "idle mode", "DRX" and "CDRX" are explicitly intended to at least include the full extent of their ordinary meaning, and are intended to encompass similar types of modes in future standards.

First RAT Measurement While Connected to a Second RAT

In some embodiments, the UE may be in an environment having two or more RATs. For example, the environment may include base stations for a first RAT (e.g., GSM) and base stations for a second RAT (e.g., TDS) and may further have base stations for a third RAT (e.g., LTE). Note that in the following, the examples of GSM and TDS are exemplary only and any combinations of various RATs are envisioned.

While the UE is connected or camped on the second RAT, it is generally desirable to monitor the first RAT for potential handover, e.g., to provide higher quality service to the user of the UE. In some embodiments, the second RAT may provide messages regarding the first RAT. For example, system information block (SIB) 12 or measurement control messages may be broadcast by the second RAT regarding the first RAT. However, the SIB12 message may not always be present. Additionally, the measurement control messages may indicate which cells to measure and what events to report, but may not specify the conditions under which the UE should perform measurement. Thus, the UE may balance performance versus power consumption in determining when to perform first RAT measurement.

Measurement of the first RAT may involve measuring RSSI (received signal strength indicator), e.g., for power measurement of a broadcast control channel (BCCH) carrier of the first RAT, tone detection, e.g., for detecting frequency correction channel presence and timing, BSIC (base station identity code) verification, e.g., for decoding the synchronization channel (SCH) for the BSIC and/or verifying BSIC against the network configuration, and BSIC reconfirmation, e.g., for re-confirming the BSIC at least once per Treconfirm_abort seconds.

In more detail, the measurement may involve measuring RSSI of up to N(r) first RAT base stations and maintaining the filtered RSSI of each cell, ranking cells based on their RSSIs, selecting a top N(c) base stations as candidates for handover, determining timing of these top N(c) base stations (FCCH detection), verifying BSIC (SCH decoding), and periodically re-confirming BSIC. If certain conditions are met, e.g., as specified by measurement control messages, events may be reported to the network. During this process, RSSI measurement and FCCH detection may be the most power intensive steps in the measurement process.

Figure 6:
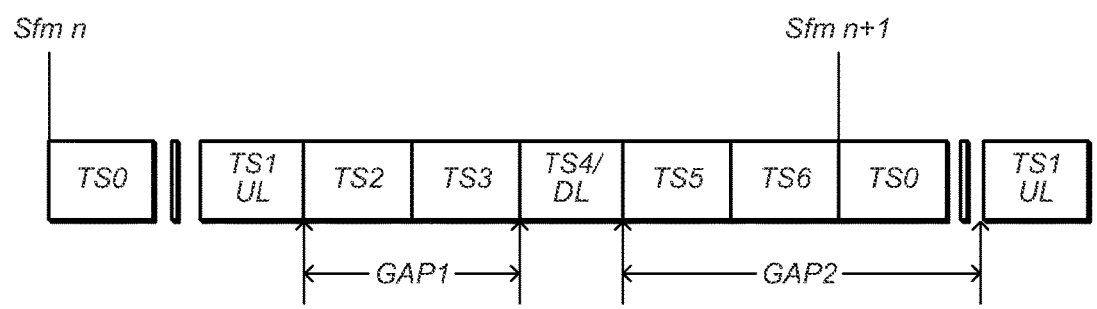
FIG. 6 illustrates an exemplary timing diagram for communication of a UE while connected to a second RAT, according to one embodiment.

While connected or camped on the second RAT, the UE may perform measurement of the first RAT during "gaps" of the second RAT (e.g., when using a single radio for both the first RAT and the second RAT). These "gaps" may be periods of time when the UE is not active on both uplink and downlink for the second RAT. FIG. 6 illustrates an exemplary timing diagram showing two gaps within an exemplary TDS communication. These gaps may be affected by static time slot allocation (e.g., voice, R4 data) as well as dynamic allocation (e.g., HSPA (HS-SCCH, E-AGCH), Inter and intra measurement of home RAT, etc.).

Thus, the UE may be configured to perform measurement of the first RAT based on a number of factors, e.g., the presence of gaps, which may depend on the channel configuration of the second RAT, the need to determine valid and latest measurement for better performance in terms of call quality or call retention rate, and/or for power saving (e.g., the UE should not over-schedule measurement). Thus, as indicated above, measurement of the first RAT should balance between call performance and power saving for the UE.

Accordingly, in one embodiment, the UE may perform measurement of the first RAT adaptively, based on metrics of the first RAT and/or other factors. For example, measurement (e.g., RSSI measurement) of the first RAT may depend on the second RAT serving base station RSCP, RSCP of second RAT neighboring base stations, the UE's current transmit power, and/or BLER (block error rate) statistics in downlink channels of the second RAT.

The rate of first RAT measurement may be affected by one or more or a combination of these metrics. For example, these metric(s) or a combination of metrics may be compared against one or more thresholds to determine how often to perform the measurement. In one embodiment, a high and a low threshold may be used (e.g., M(G) and M(F), respectively). If the metric(s) or combination of metrics is above the high threshold, then no measurement of the first RAT may be scheduled. If the metric(s) or combination of metrics is below the high threshold, but below the low threshold, then the measurement may be scheduled once per N(L) subframes. If the metric(s) or combination of metrics is below the low threshold, then the measurement may be scheduled once per N(H) subframes, where L is less than H. Alternatively, a single threshold may be used to determine whether to perform periodic measurements or not. As another option, there may be a relationship between the metric(s) or combination of metrics and the frequency of measurement, e.g., where the higher the metric(s) is, the lower the frequency of metric, which may scale across a plurality of metric(s) values.

These metric(s) (or combinations) may be augmented or modified with other factors, such as the UE's movement speed. For example, the movement speed of the UE may be categorized as low, moderate, or high. In one embodiment, the high and low thresholds may be modified based on the movement speed. For example, the high threshold may have a first value at low speed M(GL), a second value at moderate speed M(GM), and a third value at high speed M(GH), e.g., from lower to higher values. Similarly, the low threshold may have a first value at low speed M(FL), a second value at moderate speed M(FM), and a third value at high speed M(FH), e.g., from lower to higher values. Rather than having discrete values, the thresholds may be varied as a function of movement speed as desired (e.g., in a smooth fashion). Further discrete values are also envisioned.

Additionally, or alternatively, the frequency of the measurement when exceeding the high threshold may be from N(GL) (passing the "good" threshold, at "low" speed) subframes, N(GM) subframes, and N(GH) subframes, from low to high. Similarly, the frequency of the measurement when falling between the high threshold and the low threshold may be from N(FL) (for "fair" at "low" speed) subframes, N(FM) subframes, and N(FH) subframes. Finally, the frequency of the measurement when falling below the low threshold may be from N(PL) (for "poor" at "low" speed) subframes, N(PM) subframes, and N(PH) subframes.

Other factors may be considered for whether and/or the frequency of the measurement. These factors may be considered in addition to or instead of the above factors, as desired. For example, measurement may be disabled for the first RAT when a quality metric (e.g., RSCP) of the second RAT base station is above a threshold (e.g., −80 dBm for packet switched calls or −60 dBm for circuit switched or circuit switched+packet switched calls). Measurement, e.g., RSSI measurement, may be scaled down, e.g., from every 20 ms to 80 ms if the serving base station metric is above a threshold (e.g., −85 dBm). However, this scaling decision may be overridden (e.g., in a circuit switched call) if one or more of the following occurs: event 2D (e.g., related to home frequency quality) timer is triggered, event 2D is reported, event 3A (e.g., related to inter-RAT handover) timer is triggered, fast fading is detected, insufficient gap persists (e.g., CS+HSPDA), quality of service deterioration (e.g., of the second RAT), etc. These conditions may remain valid until UE leaves DCH or FACH state and/or UE handovers to another cell.

Fast fading conditions may be triggered when more than one fading instance is detected before a short timer (e.g., 200 ms). The channel may resume to normal fading if at most one fading instance is detected after expiration of a long timer (e.g., 500 ms). A fading instance may be when the difference between filtered serving base station RSCP and instantaneous RSCP is more than a threshold (e.g., 5 dB). Insufficient gap condition may persist if RSSI power scan exceeds a threshold (maxperiod) before a short timer (e.g., 400 ms) expires. This condition may be cleared if RSSI power can hits the threshold (maxperiod) at most once after a long timer (e.g., 1 second).

Measurement (e.g., FCCH tone detection) may be affected similarly by thresholds. For example, an "other_threshold" may be used for event 3A (−75 dBm, 80 dBm), where measuring base stations below this threshold may not be helpful for handover.

In one embodiment, instead of using a uniform threshold for all base stations, a base station specific threshold may be used. In one embodiment, such a threshold may be (e.g., for tone detection): T_fcch=T_other+P_hys3a/2+P_fcch_margin−P_cio, where T_other is the 3A threshold, P_hyst3A is hysteresis for 3A, P_fcch_margin is margin configured for UE, and P_cio is cell individual offset in 3A.

In one embodiment, the set of base stations of the first RAT may be managed using the following algorithm. First, let: {G} be the set of first RAT base stations for tone detection and N(G) be the number of base stations that can be admitted to {G}; {R} be the set of first RAT base stations that stay in BSIC re-confirmation and N(R) the number of base stations in {R}; {C} be the set of first RAT base stations that require RSSI measurement and N(C) the number of base stations in {C}; and N(B) be the number of base stations in {R} that satisfies: (a) RSSI>RSSI(G) and (b) pass BSIC re-confirmation consistently in last N(t) trials. The algorithm may operate as follows:

Initially, add N(Gmax) (where N(Gmax) is less than or equal to N(C)) strongest base stations in {C} to {G};

(1): Perform tone detection for base stations in {G} and BSIC re-confirmation for base stations in {R}. Remove base stations that passed tone detection from {G} and add base stations that pass BSIC verification to {R};

(2): If N(B) is less than or equal to N(Gmin), set N(G) to N(Gmax)−N(B), otherwise set N(G) to 0. Update base stations in {G};

(3) Return to step (1) for next measurement.

Figure 7:
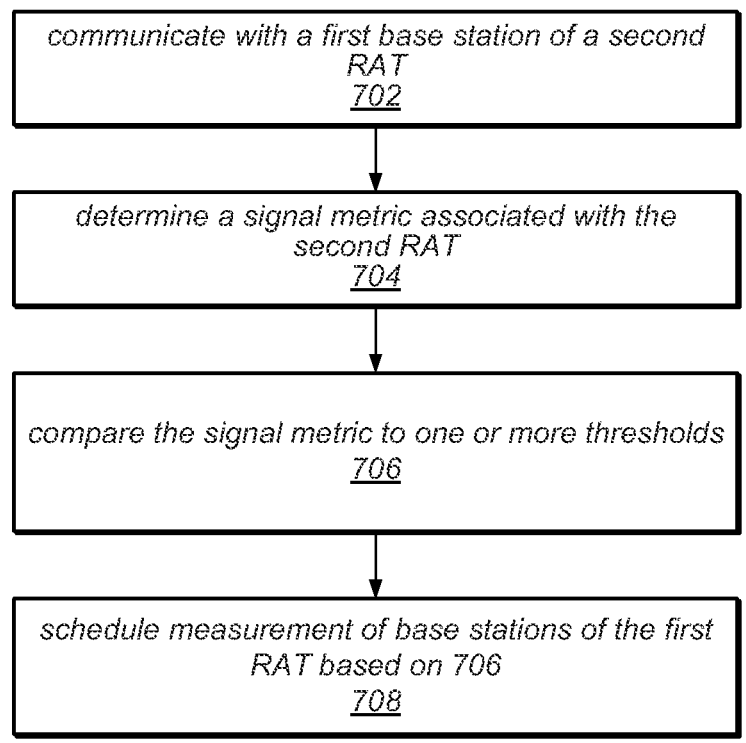
FIG. 7 is a flowchart diagram illustrating an exemplary method for performing measurement of a first RAT while connected to a second RAT, according to one embodiment.

FIG. 7—First RAT Measurement while Connected to a Second RAT

FIG. 7 is a flowchart diagram illustrating a method for performing measurement of a first RAT while connected to a second RAT. The method may be performed by a UE device (such as UE 106) that uses a single radio or multiple radios for a first RAT (e.g., GSM) and a second RAT (e.g., TDS). The UE may be configured to maintain connections to both the first RAT and the second RAT concurrently using the same radio, in some cases. The method shown in FIG. 7 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 702, the UE may communicate with at least one base station of the second RAT. More specifically, the UE may be connected to or camped on a first base station of the second RAT.

In 704, the UE may determine a first metric (e.g., a signal strength and/or signal quality metric) associated with the second RAT. The first metric may be any of various metrics or combinations of metrics, as desired. For example, the first metric may be based on signal metrics of the first base station and/or of neighboring base stations (e.g., of the second RAT or even base stations of a third RAT (e.g., LTE)). In one embodiment, the first metric may be based on RSCP (e.g., of the first base station). Other signal metrics, such as BLER, RSSI, RSRP, SINR, SNR, RSRQ, EC/IO, etc. are envisioned. Quality of service metrics are also envisioned.

In 706, the UE may compare the first quality metric to one or more thresholds, and in 708, the UE may schedule measurement of base stations of the first RAT based on the comparison in 706. In one embodiment, the one or more thresholds may include a single threshold or may include a plurality of thresholds (e.g., a high threshold and a low threshold). The thresholds may be used for all base stations or environments, or may be specific to RATs, single base stations, groups of base stations, etc.

As one example, measurement of the base stations of the first RAT may not be scheduled if the first metric exceeds a threshold, and wherein measurement of the base stations of the first RAT is scheduled if the first metric does not exceed the first threshold. As another example, the frequency of measurement of the base stations of the first RAT may be modified based on whether the first metric passes the threshold or not. For example, the measurement may be scheduled less frequently if the metric exceeds the threshold than if it does not. In one embodiment, a plurality of thresholds may be used, e.g., such as a higher and lower threshold as discussed previously.

In one embodiment, the one or more thresholds may be adjusted, e.g., in a dynamic fashion. For example, the threshold(s) may increase or decrease dynamically based on the movement speed or velocity of the UE. For example, the thresholds may have a higher value when the UE is moving faster and a lower value when the UE is moving slower. The thresholds may also be varied based on other factors, as desired.

While 708 may be based on the signal metric discussed in 704, other factors may be used for scheduling, such as those discussed previously. For example, fading conditions (e.g., whether the current state is a "fast fading" state), gap persistency, quality of service, and/or events (among other possibilities) may impact how the measurement is scheduled.

Note that the modification of scheduling of measurement of base stations of the first RAT may impact an entire measurement process or individual portions of a measurement process. For example, certain portions of the measurement process may be more costly in terms of power than others. Accordingly, the method of FIG. 7 may be applied to individual portions of the measurement process (e.g., RSSI measurement or tone detection, etc.) rather than the entire measurement process. Of course, the method may apply to the entire measurement process, if desired.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a user equipment device (UE) comprising one or more radios, wherein the one or more radios are configurable to operate according to a first radio access technology (RAT) and a second RAT:

communicating with a first base station of the first RAT;
communicating with a first base station of the second RAT, wherein the one or more radios are configured to maintain a connection to both the first and second RATs concurrently, wherein the first RAT is a cellular RAT, wherein the second RAT is a cellular RAT, and wherein the first RAT is a lower generation than the second RAT;
determining a first signal metric associated with the second RAT;
comparing the first signal metric to a first threshold and a second threshold, wherein the first threshold is higher than the second threshold;
scheduling measurement of one or more base stations of the first RAT if the first signal metric does not exceed the first threshold, wherein measurement of the one or more base stations of the first RAT is not performed if the first signal metric exceeds the first threshold, and wherein frequency of measurement of the one or more base stations of the first RAT is determined based on the first signal metric being below the first threshold or being below the second threshold;
performing handover based on measurement of the one or more base stations of the first RAT; and
after performing handover, maintaining a connection to both the first and second RATs concurrently.

2. The method of claim 1, wherein said scheduling measurement of the one or more base stations of the first RAT comprises scheduling measurement of the one or more base stations of the first RAT more frequently if the first signal metric is below the second threshold than if the first signal metric is below the first threshold but above the second threshold.

3. The method of claim 1, further comprising:
dynamically adjusting the first threshold and the second threshold.

4. The method of claim 3, further comprising:
determining a velocity of the UE;
wherein said dynamically adjusting the first threshold and the second threshold is based on the velocity of the UE.

5. The method of claim 4, wherein said dynamically adjusting the first threshold and the second threshold comprises increasing values of the first threshold and the second threshold for higher velocities of the UE.

6. The method of claim 1, wherein the first signal metric is based on downlink error rates associated with the second RAT.

7. The method of claim 1, wherein the first signal metric is based on a received signal code power (RSCP) of the first base station.

8. The method of claim 1, wherein the first signal metric is based on a received signal code power (RSCP) of one or more neighboring base stations of the second RAT.

9. The method of claim 1, wherein the first signal metric is based on a current transmit power.

10. The method of claim 1, wherein said scheduling measurement of the one or more base stations of the first RAT is also based on fading conditions of the second RAT.

11. A user equipment device (UE), comprising:
a first radio, wherein the first radio is configured to perform communication using a first radio access technology (RAT) and a second RAT; and
one or more processors coupled to the first radio, wherein the one or more processors and the first radio are configured to:

communicate with a first base station of the first RAT;
communicate with a first base station of the second RAT, wherein the first radio is configured to maintain a connection to both the first and second RATs concurrently, wherein the first RAT is a cellular RAT, wherein the second RAT is a cellular RAT, and wherein the first RAT is a lower generation than the second RAT;
determine a first signal metric associated with the second RAT;
compare the first signal metric to a plurality of thresholds;
scheduling measurement of one or more base stations of the first RAT based on comparing the first signal metric to the plurality of thresholds, wherein scheduling measurement of the one or more base stations of the first RAT comprises modifying a frequency of scheduling measurement of the one or more base stations of the first RAT based on comparing the first signal metric to the plurality of thresholds;
perform handover based on measurement of the one or more base stations of the first RAT; and
after performing handover, maintain a connection to both the first and second RATs concurrently.

12. The UE of claim 11, wherein the plurality of thresholds comprise a first threshold, wherein measurement of the one or more base stations of the first RAT is not scheduled if the first signal metric exceeds the first threshold, and wherein measurement of the one or more base stations of the first RAT is scheduled if the first signal metric does not exceed the first threshold.

13. The UE of claim 12, wherein the plurality of thresholds comprise a second threshold, wherein the second threshold is lower than the first threshold, wherein the frequency of measurement of the one or more base stations of the first RAT is determined based on the first signal metric being below the first threshold or being below the second threshold.

14. The UE of claim 11, wherein the one or more thresholds are dynamically adjusted based on movement speed of the UE.

15. The UE of claim 11, wherein the first signal metric is based on a received signal code power (RSCP) of the first base station of the second RAT.

16. The UE of claim 11, wherein the first signal metric is based on a received signal code power (RSCP) of one or more neighboring base stations of the second RAT.

17. The UE of claim 11, wherein the first RAT comprises global system for mobile communications (GSM) and wherein the second RAT comprises time division synchronous code division multiple access (TDS).

18. An apparatus for inclusion in non-transitory, computer accessible memory medium storing program instructions for execution by a user equipment device (UE), wherein the UE comprises a first radio for communicating using a first radio access technology (RAT) and a second RAT, wherein the apparatus comprises:
one or more processing elements, wherein the one or more processing elements are configured program instructions are executable by a processor to:
communicate with a first base station of the first RAT;
communicate with a first base station of the second RAT, wherein the first radio is configured to maintain a connection to both the first and second RATs concurrently, wherein the first RAT is a cellular RAT, wherein the second RAT is a cellular RAT, and wherein the first RAT is a lower generation than the second RAT;

determine a first signal metric associated with the second RAT;

compare the first signal metric to one or more thresholds; and scheduling schedule measurement of one or more base stations of the first RAT based on comparing the first signal metric to the one or more thresholds, wherein scheduling measurement of the one or more base stations of the first RAT based on comparing the first signal metric to the one or more thresholds comprises modifying a frequency of measurement of the one or more base stations of the first RAT based on comparing the first signal metric to the one or more thresholds;

perform handover based on measurement of the one or more base stations of the first RAT; and after performing handover, maintain a connection to both the first and second RATs concurrently.

19. The apparatus of claim 18, wherein the one or more thresholds comprise a first threshold, wherein measurement of the one or more base stations of the first RAT is not scheduled if the first signal metric exceeds the first threshold, and wherein measurement of the one or more base stations of the first RAT is scheduled if the first signal metric does not exceed the first threshold.

20. The apparatus of claim 18, wherein the one or more thresholds comprise a second threshold, wherein the second threshold is lower than the first threshold, wherein the frequency of measurement of the one or more base stations of the first RAT is determined based on the first signal metric being below the first threshold or being below the second threshold.

* * * * *

UNITED STATES PATENT AND TRADEMARK OFFICE
CERTIFICATE OF CORRECTION

PATENT NO. : 9,843,939 B2
APPLICATION NO. : 14/279412
DATED : December 12, 2017
INVENTOR(S) : Xiantao Sun et al.

It is certified that error appears in the above-identified patent and that said Letters Patent is hereby corrected as shown below:

In the Claims

Claim 18, Column 19, Line 8, please delete "scheduling schedule" and substitute --schedule--.

Signed and Sealed this
First Day of May, 2018

Andrei Iancu
*Director of the United States Patent and Trademark Office*